Aug. 25, 1953 — C. G. MINOR — 2,649,699
REFRIGERATOR CABINET
Original Filed Feb. 21, 1946 — 4 Sheets-Sheet 1

Inventor
Charles G. Minor
By Albert G. McCaleb
Atty.

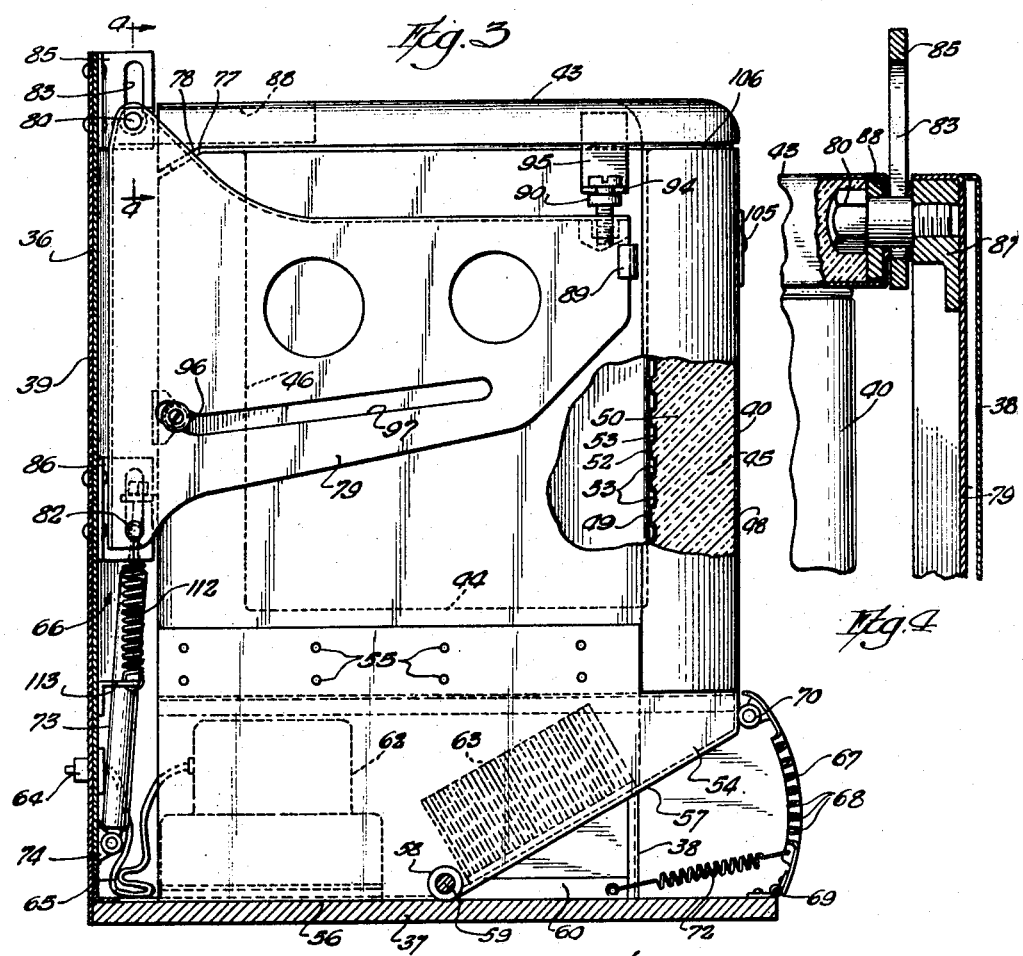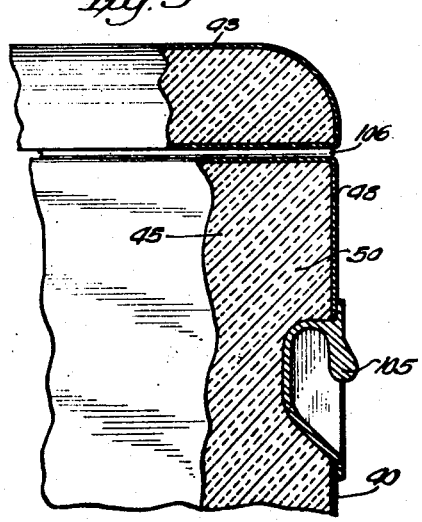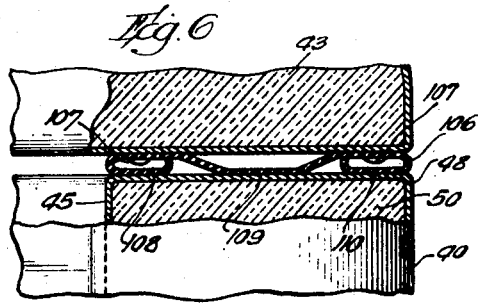

Aug. 25, 1953   C. G. MINOR   2,649,699
REFRIGERATOR CABINET
Original Filed Feb. 21, 1946   4 Sheets-Sheet 3
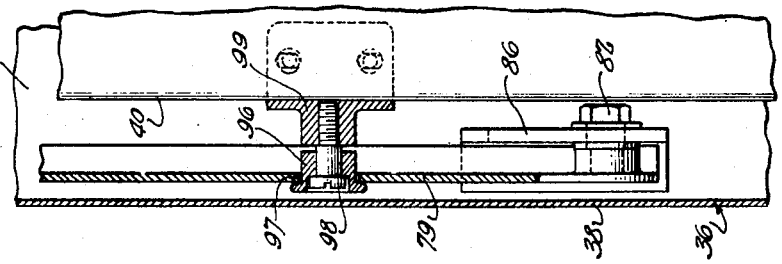
Inventor
Charles G. Minor
By Albert S. McCaleb
Atty Aug. 25, 1953 C. G. MINOR 2,649,699
REFRIGERATOR CABINET
Original Filed Feb. 21, 1946 4 Sheets-Sheet 4
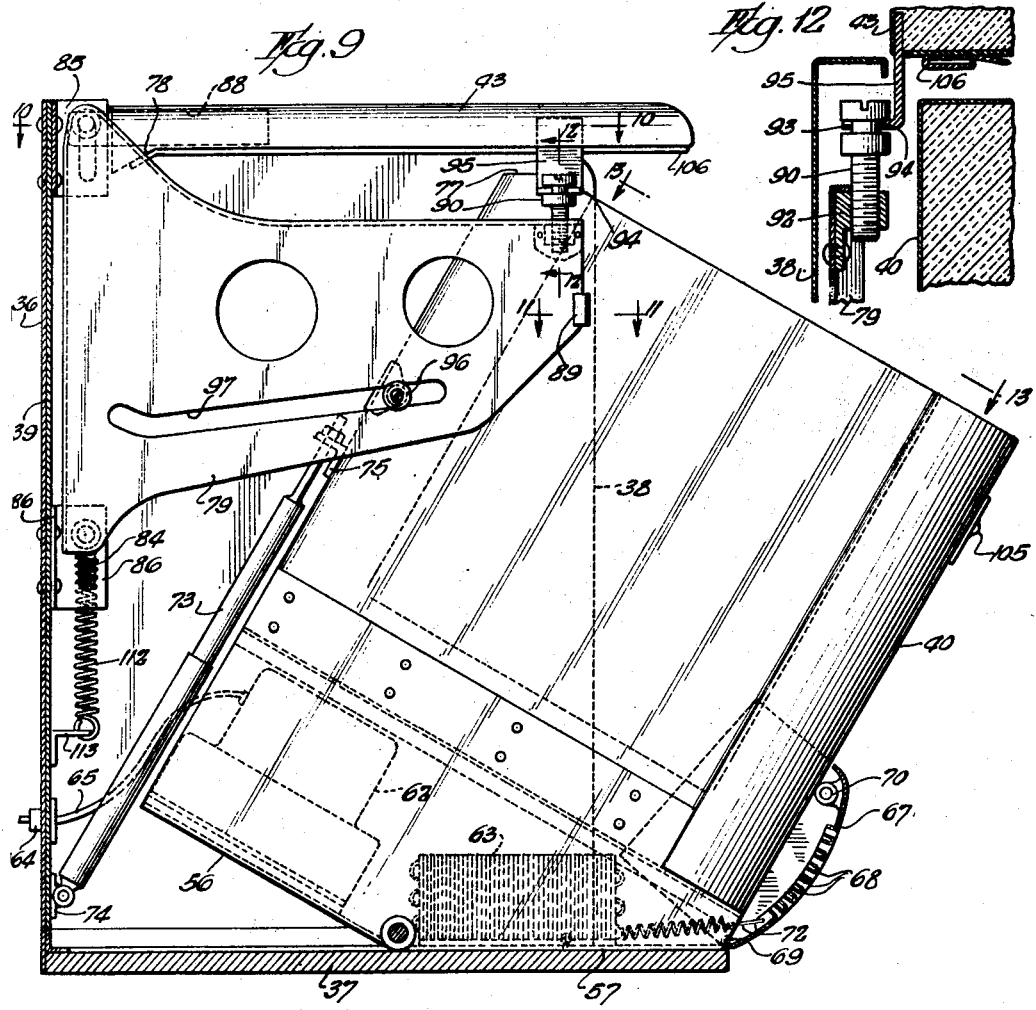

Patented Aug. 25, 1953

2,649,699

UNITED STATES PATENT OFFICE 2,649,699

REFRIGERATOR CABINET

Charles G. Minor, Evanston, Ill., assignor of one-half to Albert G. McCaleb, Evanston, Ill.; Harry H. Gmeiner, executor of said Charles G. Minor, deceased; Ruth F. McCaleb, executrix of said Albert G. McCaleb, deceased Original application February 21, 1946, Serial No. 649,240, now Patent No. 2,537,367, dated January 9, 1951. Divided and this application May 25, 1950, Serial No. 164,111

8 Claims. (Cl. 62—117.4)

My present invention relates to tiltable refrigerator cabinets, and more particularly to those adapted to use for food preservation and storage in homes, stores, restaurants and the like.

This application is a division of my co-pending application Serial No. 649,240, filed February 21, 1946, now Patent No. 2,537,363, January 9, 1951, and entitled "Tiltable Cabinets."

Added to the multitudinous problems confronted in refrigerator cabinet design with respect to the provision of a well insulated and efficient cabinet, as well as those related to manufacturing processes and costs, there are also, in addition to general appearance, those further considerations concerned with accessibility and visibility of the contents, convenience of adding to and removing articles from the contents of the cabinet and the ratio of storage space to the useable space in a room which is occupied by the cabinet and necessarily kept clear for its use. While the refrigerator cabinets disclosed herein for illustrative purposes comprise designs calculated to include provisions for good heat insulation and to take advantage of many factors contributing efficiency and durability, as well as sound manufacturing practices, particular attention has been paid to the improvements of accessibility, visibility and classification of the contents, convenience of use, and large capacity in proportion to the room space required, as well as general utility and appearance.

It is, therefore, among the more general objects of my invention to provide refrigerator cabinets embodying features of sound structural design and which are generally improved from the standpoints of utility and convenience in use.

As another object, the present invention comprehends the provision of refrigerator cabinets constructed and arranged to promote improved ease of access to all parts of the interior.

My invention further contemplates the provision of refrigerator cabinets wherein a part which serves an essential function in the cabinet structure may also be used as a conveniently disposed utility shelf when the cabinet is either open or closed, and which utility shelf is particularly well placed and suited to use during placement of material in or removal of material from the cabinet.

Another object of my invention is to provide refrigerator cabinets in which the opening of the cabinets is effected by relatively movable cabinet parts and in a manner such that air turbulence at the opening and the resultant interchange of heat and moisture between the chilled air within the cabinet and the surrounding atmosphere are definitely limited.

The present invention has for another object the provision of refrigerator cabinets in which the cover and body portion of the cabinet are so movable relative to one another for opening the cabinet that, while free access is provided to the interior without the necessity of manually holding one of the parts, the cover may be utilized as an adjacent loading or unloading shelf before, during and/or after the opening movement.

It is further contemplated, as an object of the present invention, to provide refrigerator cabinets in which the closure means is normally biased toward its closed position so as to effect a good heat insulating seal between the parts which are separable for opening.

In addition to providing refrigerator cabinets having one or more of the aforementioned features, I have also provided cabinets with the mechanical refrigeration units housed therein and which have ample provision for the circulation of cooling air around the refrigeration units.

As an additional feature, it is an object of my present invention to provide refrigerator cabinets in which frosting and thermosyphonic action are minimized.

Other objects and advantages of the invention will be apparent from the following description and the accompanying drawings in which similar characters of reference indicate similar parts throughout the several views.

Referring to the four sheets of drawings:

Fig. 3 is an end sectional view of the refrigerator cabinet shown in Figs. 1 and 2 with the parts in their normally closed relationship and with portions cut away to illustrate certain details of the structure;

Fig. 4 is an enlarged fragmentary sectional view of a portion of the refrigerator cabinet structure illustrated in Fig. 3, with the section taken substantially on a line 4—4 of Fig. 3;

Figs. 5 and 6 are each fragmentary views drawn to an enlarged scale of portions of the refrigerator cabinet structure shown in Figs. 1 to 3, inclusive, and each of which has cut away portions for the illustration of structural details;

Fig. 7 is a fragmentary end elevational view of a portion of the structure shown in Fig. 3, but drawn to a larger scale and depicting the movements of certain parts of the refrigerator cabinet in passing between the open and closed positions;

Fig. 8 is a fragmentary sectional view drawn to an enlarged scale of a portion of the refrigerator structure shown in Fig. 7 and wherein the section is taken substantially on a line 8—8 of Fig. 7;

Fig. 9 is a view similar to Fig. 3, but depicting the relative positions of the refrigerator cabinet parts when the cabinet is open for access to the interior;

Figure 1:
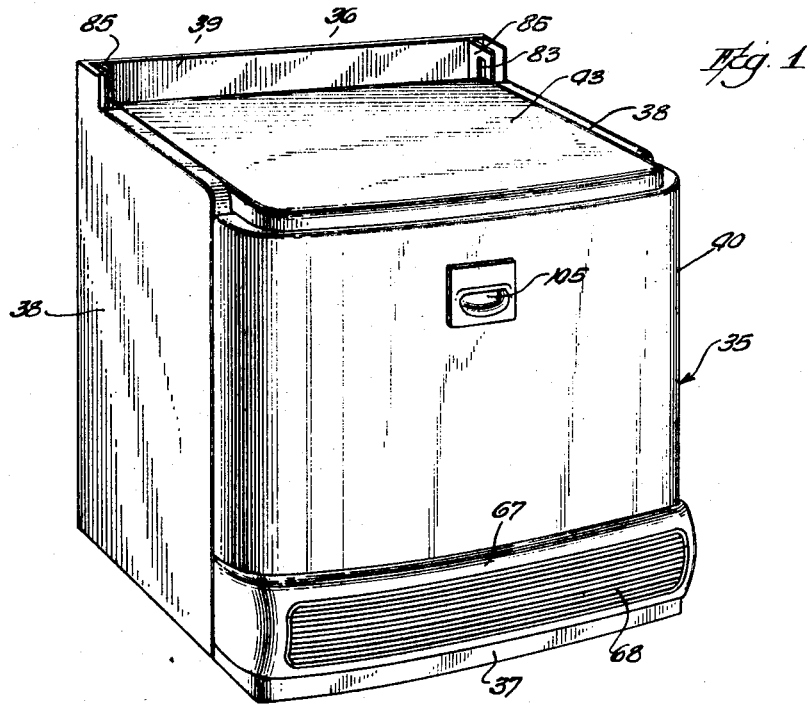
Figs. 1 and 2 are respectively perspective views of a refrigerator cabinet embodying a preferred form of my invention which depict the positions of the parts in their closed and open positions.

Figs. 10, 11 and 12 are respectively fragmentary sectional views to an enlarged scale of portions of the refrigerator cabinet structure shown in Fig. 9, and wherein the sections are taken substantially on lines 10—10, 11—11, and 12—12 of Fig. 9.

The various views and forms of my invention which are depicted in the accompanying drawings are illustrative of certain structural features and principles of my invention as well as exemplary of structural modifications and variations which may be made without departing in any way from the purview of the invention. On the contrary, such modifications and variations have been illustrated by way of indication of the range of adaptations of the invention rather than to depict limitations.

In order to simplify the description of the various illustrative and modified forms of my invention and because of the considerable number of substantially similar parts in the various forms, those similar parts will be referred to by like reference numerals throughout the several views and the descriptions of such parts will be considered to apply to all of the views, except in respect to the differences particularly pointed out.

Figs. 1 to 12, inclusive, illustrate a preferred embodiment of my refrigerator cabinet which is well adapted, although not limited, to use for the preservation of frozen foods and the like and/or the freezing or storage of foods and the like. In such an adaptation the temperature of the interior of the cabinet is maintained at a lower value than in refrigerators used for the preservation of foods at temperatures above that at which they will freeze. Usually when foods are frozen for storage or preserved in their frozen state, the expected time of preservation is longer than for the preservation of foods at temperatures above freezing, and, as a general rule, such foods when frozen are in a solid state. Thus they may be packed within the refrigerator cabinet in closely spaced relationship and without the desirability of having momentary access to any one of a wide variety of the stored articles. Although classification by segregation is desirable in any instance, some articles may be removed from the interior of the cabinet to accomplish the infrequent access to others and without detriment, over a reasonable period, to the removed frozen articles.

Since the frozen foods and the like may be closely packed within the refrigerator cabinet, a compact cabinet of reasonably small volume furnishes storage capacity for a considerable amount of such frozen food. In my refrigerator cabinet which is depicted in Figs. 1 to 12, inclusive, I have not only taken into account the provision of a cabinet having an easily accessible interior within easy view of the user and which provides a large storage space as compared with the room space occupied thereby, but I have also provided a cabinet which limits the heat loss due to opening and closing, and provides a shelf which is particularly useful in an adaptation to the storage of frozen foods because of its usefulness during loading and unloading of the cabinet or during the removal and replacement of articles when access is desired to those beneath the ones at the top of the cabinet.

Figure 2:
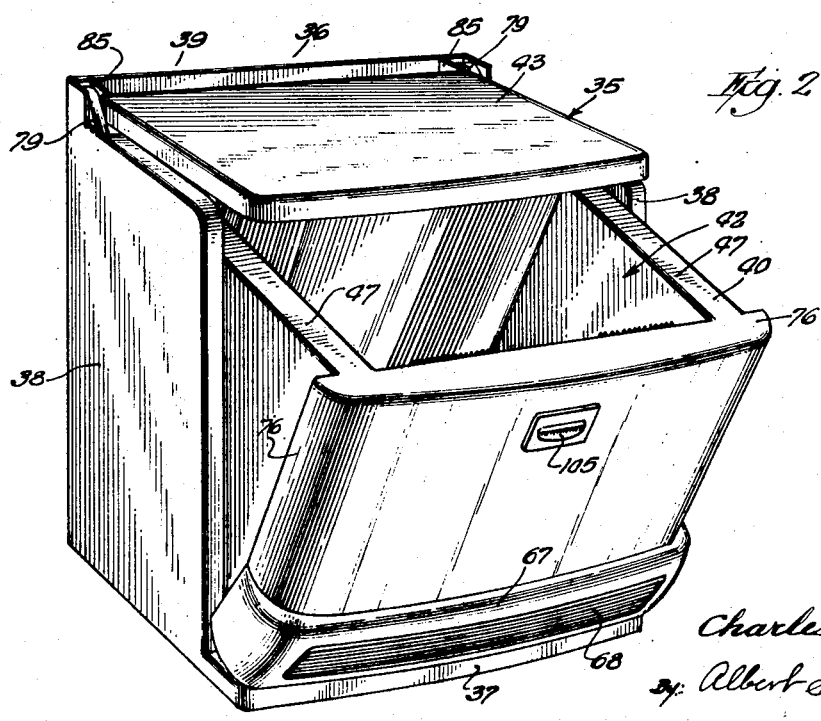

Generally considered, and as depicted in Figs. 1 and 2, the refrigerator cabinet 35 includes an outer casing 36 which comprises a base 37 to which are secured opposed and upwardly extending end walls 38 and a back wall 39. The base 37 may be made of either metal or wood, while the end walls 38 and back wall 39 are preferably made of suitably cut and formed sheet metal parts. A heat insulated container 40 defines a refrigerated compartment 42 for the storage of foods and the like and coacts with a heat insulating cover 43 to form a closed refrigerating chamber. For ease of access, even to articles placed in the bottom of the compartment 42, and so that the cover 43 may be utilized as a temporary loading and unloading shelf, I have so constructed my disclosed cabinet that the heat insulated container 40 may be opened for access to the interior by forward rocking movement during which the cover 43 remains in a substantially horizontal position and is handily disposed adjacent the open top of the insulated container when the container is moved to its open position.

Having more detailed reference to the structure by which the foregoing and other advantageous features of operation are attained, and referring more generally to Figs. 1 to 12, inclusive, the heat insulated container 40 has a bottom 44, front and rear walls 45 and 46, respectively, and end walls 47 which walls are desirably constructed with suitably shaped exterior and interior metal shells 48 and 49, respectively, secured together at the top by suitable means, such as welding, and between which is a substantial filling 50 of heat insulating material. Although other shapes might be utilized for similarly constructed cabinets, it is my preference in the present instance that the insulated cabinet 40 shall be rectangular in both transverse directions, and present a generally flat upper surface around the refrigerated compartment. As illustrated in Fig. 3, it is also my preference that the interior metal shell 49, in addition to providing a smooth inner lining for the container, shall also serve as a part of an evaporator 52 having tubes 53 for the evaporation of the refrigerant which cools the refrigerated compartment. For prividing well distributed and effective refrigeration, the evaporator 52 covers the inner surfaces of the front and rear walls 45 and 46 and the end walls 47, so as completely to encircle the refrigerated compartment.

To support the heat insulated container for rocking movement between upright and forwardly tilted positions, as shown in Figs. 3 and 9, respectively, and to provide stable support for the container in each of those positions, I have provided metal plates 54 which are secured to each end of the container by suitable fastening means, such as rivets 55, and have lower edges 56 and 57 disposed in obtuse angular relationship. Each of the metal plates 54 carries a bearing 58 substantially at the vertex of the angularly disposed sides 56 and 57 which is rotatably carried by a shaft 59. Although suitable operation and tilting action are attainable with the axis of the shaft 59 disposed at different positions relative to the base 37, it is deemed preferable in the present instance, that the axis be located substantially midway between the front and rear edges of the base 37. The shafts 59 on each side of the base are carried by suitable means, such as an angle iron base frame 60 which is secured to the lower edge of the end walls 38 of the outer casing and to the base 37.

The height of the metal end plates 54 is not only sufficient to provide a suitable obtuse angle between the lower edges 56 and 57 of the plate for supporting the insulated container in suitable upright and tilted positions, but is also desirably sufficient to provide room beneath the bottom of the insulated container for housing parts of the refrigeration apparatus of any desired type which are illustrated for exemplary purposes as a compressor unit 62 and a condenser unit 63. With this type of refrigeration apparatus, electrical connections are made to the compressor unit through a connector 64, mounted on the back wall 39 of the outer casing, and conductors such as 65.

In the form of my refrigerator cabinet depicted in Figs. 1 to 12, inclusive, the compressor unit 62 and condenser unit 63 are carried by suitable support strips extending between the lower edges of the metal end plates 54 so that those units move with the insulated container when it is tilted and have normal positions dependent upon the position of the container. In this instance the connections for the flow of refrigerant to and from the evaporator 52 are fixed relative to each of the parts of the refrigeration system and need not include any flexible connections. The conductors 65 are flexible to permit the movement of the electrically driven compressor unit. The positions assumed by the compressor unit and condenser unit when the container is in its upright and tilted positions are illustrated in Figs. 3 and 9, respectively.

With the parts of the refrigeration system housed within the outer casing 36, and between the base 37 and the bottom of the insulated container, it is necessary to provide for the circulation of cooling air through the condenser unit and around the compressor unit. For this reason the insulated container 40 is desirably secured to the base 37 in a position such that it is spaced forwardly from the back wall 39 of the outer casing 36, so as to provide a passage 66 for the flow of cooling air upwardly between those parts of the cabinet. The cooling air enters the space between the bottom of the insulated container 40 and the base 37 through the front.

Although a cover 67 is provided to improve the appearance of the lower portion of the front of the cabinet, that cover has a series of louvers 68 which permit the inward passage of cooling air through the cover. In order that the cover 67 may be free to move with the insulated container 40 when it is tilted, it is carried at its lower edge by a hinge 69 secured to the front margin of the base 37. Rotatably supported rollers 70 are desirably carried by the cover 67 near the upper edge thereof and engage the front surface of the insulated container to roll along the surface of the container as it is tilted. Resilient means, such as a tension spring 72, having one end connected to the cover and one end anchored to the base, biases the cover toward the container and maintains engagement of the roller 70 with the container.

In order to cushion the extremities of the tilting movements of the container 40 and to regulate its rate of movement in either direction, I have provided a fluid controlled dashpot 73 which has one end rotatably anchored to the back wall 39 of the outer casing by means such as a bracket 74, and its other end adjustably connected to the outer surface of the rear wall 46 of the insulated container through means such as a bracket 75. The action of the dashpot is such that it prevents quick or sudden movements of the container in either direction after the tilting has been started, and prevents jolts to the container or its contents at the extremities of the tilting movements.

To improve the outer appearance and smoothness of the cabinet, the front wall 45 of the insulated container desirably has laterally projecting side wings 76 extending to positions flush with the outer surfaces of the end walls 38 of the casing and engaging the front surfaces of those end walls when the container is in the upright position.

Since the container 40 tilts about an axis which is disposed between the front and rear walls thereof, the front wall 45 and the front portions of the end walls 47 have downward components of movement which accompany the forward tilting of the container; while the rear wall 46 and the rear portions of the end walls 47 have upward components of movement. Thus, in order for the cover 43 to clear the upper surface of the container during such tilting movement, while providing a relatively tight closure seal when the container is in the upright position, the cover must be moved upwardly away from the top of the container during the forward tilting movement and moved downwardly to the top of the container during its return movement. In order to effect the provision of additional relief for the separation of the cover from the top surface of the container along the rear edge of the container, I prefer to bevel the rear top surface of the container, as indicated at 77 in Figs. 3, 7 and 9. The cover 43 has a coacting sloping surface 78 along its rear edge. The slope of those coacting surfaces effects more direct separation and engagement between those parts of the surfaces during the initial separation and final closing movements.

As has been mentioned heretofore, I also consider it desirable that the cover 43 shall be supported in a horizontal position when the container is opened by tilting movement so that it may be utilized as a convenient shelf for the support of articles during the loading and unloading of the refrigerated compartment. In order to provide a substantial support for the cover 43, as well as to effect its upward and downward movements during the tilting of the container and without the necessity of separate manual operations, I have provided a cover raising and support mechanism which automatically actuates the cover in response to the tilting movements of the container. This mechanism includes forwardly extending side arms 79 which are disposed between the end walls 38 of the outer casing and the end walls 47 of the insulated container. Each of the forwardly extending side arms 79 is carried for linear vertical movement by vertically separated studs 80 and 82 located near the rear edge of the arm and slidable in slots 83 and 84, respectively, in brackets 85 and 86 which are secured to and carried by the back wall 39 of the casing, as depicted in Figs. 3, 7, 9 and 10. As illustrated in Fig. 10, the studs 80 preferably have end portions threaded into brackets, such as 87, secured to the inner surfaces of the arms 79. In the case of the upper studs 80, they extend through rearwardly projecting support bars 88 on opposite sides of the cover 43 to support the rear edge of the cover in addition to extending through the slots 83 in the brackets 85. At their forward ends the arms 79 are guided and supported for sliding movement by channels 89 carried by the end walls 38 of the casing, as shown in Fig. 11.

To provide an adjustable support for the front of the cover 43 from the forward end portions of the arms 79, I have provided screws 90 on each side of the cover which are threaded into brackets, such as 92 (Fig. 12), secured to the upper edges of the inner surfaces of the arms 79. The head portions of the screws 90 have a circumferential channel 93 in which a bifurcated end portion 94 of a cover support bracket 95 is mounted. While the screws 90 are rotatable relative to the bifurcated end portions of the brackets 95 to permit vertical adjustment of the position of the cover relative to the arms 79 and the upper surface of the insulated container 40, those end portions are retained within the channel in both vertical directions of movement to tie the cover and arms together for movement in both directions. The upper ends of the brackets 95 are secured to the outer edge portions of the cover.

Although various forms of motion translating mechanisms or linkages are usable for effecting vertical movement of the cover 43 in response to tilting movements of the container 40, the result is effected in the presently disclosed embodiment of my invention by camming means including a cam roller 96 rotatably supported on each side of the container 40 and coacting with the surfaces of a slot 97 in each of the arms 79. Each of the rollers 96 is rotatably supported by a screw 98 having an end portion threaded into a bracket 99 secured to the outer surface of the insulated container 40, as shown in Fig. 8. By preference, the shape of the slot is such that the initial tilting movement of the container 40 from its upright position effects a relatively quick and sudden rise of the cover 43 away from the upper surface of the container. After the initial separation of the cover from the container, the movement of the cover need only be sufficient to maintain a clearance between the cover and the container during the remainder of the tilting movement of the container. The rapid initial separation of the cover from the container is produced by an angularly disposed end portion 100 of the slot 97; while the remainder of the movement of the cover is controlled by the remaining relatively straight portion of the slot.

As shown in Fig. 7, the arcuate path of the rear edge portion of the container is substantially as indicated by the dot and dash line 102. During that movement of the container 40, the movement of the cover corresponding to the various angular positions of the container is substantially as indicated by the dot and dash line 103. A portion 104 of the line 103 depicts the rapid initial separation of the cover 43 and its rapid seating movement during the starting and completion of the container movements from and to the upright position.

When the container is moved from its upright position, as shown in Fig. 3, to the forwardly tilted position shown in Fig. 9, the side arms 79 are moved vertically and carry with them the cover 43. Fig. 7 provides a composite indication of the movement of the parts. During the forward tilting movement of the container 40, the cam roller 96 moves from the position shown in solid lines to that indicated in dot and dash lines at 96a. Coaction between the roller 96 and the edge of the slot 97 produces the upward movement of the arms 79 so that the slot reaches a position such as that depicted in dot and dash lines at 97a and the cover reaches substantially the position depicted by the dot and dash lines at 43a. The dot and dash lines 40a indicate the forwardly tilted position of the container.

Manual movement of the container 40 between its upright and tilted positions is facilitated by the provisions of a handle 105 which is secured to the front wall 45 of the container.

Although various forms and types of gaskets may be utilized to provide a tight seal between the cover 43 and the top surface of the insulated container 40, the present embodiment of my invention includes a gasket 106 which is made of a relatively flexible and wear-resistant heat insulating material and has a plurality of contacting surfaces engaging the cover and container, as shown in Fig. 6. The gasket 106 in this instance is secured to the cover by fastening means, such as rivets 107, along the inner and outer edges thereof, and has portions 108, 109 and 110 which engage the upper surface of the heat insulated container.

Adjustment of the screws 90, which interconnect the cover 43 and the arms 79, controls the angular position of the cover relative to those arms and also adjusts the level of the cover so that a tight squeeze is effected against the surfaces of the gasket thereby to produce a tightly sealed joint. In order further to insure a tight seal between the cover 43 and the top surface of the container 40, a tension spring 112 biases each of the arms 79 downwardly and thereby adds to the force of the gravity in holding the cover 43 and its gasket against the upper surface of the container. One end of each of the springs 112 is anchored to a bracket 113 on the inner surface of the back wall 39 of the outer casing. The other end of each of the springs is connected to one of the arms 79. Having the parts thus held in their closed positions, no latch mechanism is required for the purpose.

With the compressor 62 and condenser 63 mounted directly on the base 37, those parts remain stationary when the container is tilted. As a result, those parts and their weight need not be moved during the tilting of the container. It is necessary, however, to provide flexible elements in the connections between those parts of the refrigeration system and the evaporator which is carried within the container.

In the various forms of refrigerator cabinets disclosed and described herein, the refrigerated compartments may be opened by a relative lateral movement between the heat insulated container and its coacting cover. Such relative lateral movement has very little tendency to effect turbulence of the air adjacent the opening as the movement occurs and, consequently, limits to a very great extent the interchange of air between the interior and exterior of the refrigerated compartment. Such interchange of the air is not only detrimental because of the accompanying heat loss but also because of the usual interchange of moisture and the resultant frosting of the interior of the refrigerated compartment.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A refrigerator assembly comprising, in combination, an outer casing including a base, a back wall and end walls, a heat insulated box-like housing fitting between said end walls of the outer casing, means including side panels having angularly disposed lower edge portions and trunnion supports carrying said box-like housing at a distance above said base for rocking movement between said end walls and from and toward said back wall, said box-like housing having an upright position and a forwardly tilted position, in each of which positions said box-like housing is supported through one of said angularly disposed edges of each of the side panels, a refrigerating unit housed in the space between said base and the box-like housing, said box-like housing being spaced from the back wall of the outer casing to provide an air passage communicating with the space below the box-like housing, and hingedly supported means for covering the space between the base and box-like housing and movable with the box-like housing, the last mentioned means having louvers therein for the passage of air.

2. A refrigerator assembly comprising, in combination, an outer casing including a base, a back wall and end walls, a heat insulated box-like housing fitting between said end walls of the outer casing, means including trunnion supports carrying said box-like housing at a distance above said base for rocking movement between said end walls and from and toward said back wall, said box-like housing having an upright position and a forwardly tilted position, a refrigerating unit housed in the space between said base and the box-like housing, said box-like housing being spaced from the back wall of the outer casing to provide an air passage communicating with the space below the box-like housing, and means for covering the space between the base and box-like housing, the last mentioned means having louvers therein for the passage of air.

3. A refrigerator assembly comprising, in combination, an outer casing including a base, a back wall and end walls, a heat insulated box-like housing fitting between said end walls of the outer casing, means including side panels having angularly disposed lower edge portions and trunnion supports disposed substantially midway between said back wall and the front of said base for carrying said box-like housing at a distance above said base for rocking movement between said end walls and from and toward said back wall, said box-like housing having an upright position and a forwardly tilted position, in each of which positions said box-like housing is supported through one of said angularly disposed edges of each of the side panels, a refrigerating unit housed in the space between said base and the box-like housing, and means for supporting said refrigerating unit between said side panels and in fixed relationship relative to the box-like housing, said box-like housing being spaced from the back wall of the outer casing to provide an air passage communicating with the space below the box-like housing.

4. In combination, a refrigeration unit including compressor means, a condenser and an evaporator, a base, side walls secured to and extending upwardly from opposite ends of the base, a heat insulated container having a bottom and fitting between said side walls, means for supporting said container between the side walls for rocking movement therebetween to upright and tilted positions, said container being supported at a height to provide room for housing the compressor means and condenser between the base and the bottom of said container and between said side walls, and means for covering the space between said base and said container along the side of the container toward which it rocks to said tilted position, means providing a hinge support for the last mentioned covering means to permit movement of the covering means with said container, and resilient means for biasing said covering means toward the container.

5. A refrigerator assembly comprising, in combination, an outer casing including a base, a back wall and end walls, a heat insulated box-like housing fitting between said end walls of the outer casing, means including trunnion supports carrying said box-like housing at a distance above said base for rocking movement between said end walls and from and toward said back wall, said box-like housing having an upright position and a forwardly tilted position, a refrigerating unit housed in the space between the base and the box-like housing, and means for covering the space between the base and box-like housing, the last mentioned means having louvers therein for the passage of air.

6. In combination, an outer casing including a base and end walls, a heat insulated box-like housing fitting between said end walls of the outer casing, means including side panels having angularly disposed lower edge portions and aligned trunnion supports providing an axis extending across the mid-portion of the base for carrying said box-like housing at a distance above the said base for rocking movement between the said end walls, said box-like housing having an upright position and a forwardly tilted position, in each of which positions said box-like housing is supported through contact of one of said angularly disposed edges of each of the side panels with said base, a refrigerating unit housed in the space between the base and the box-like housing, and means for supporting said refrigerating unit between said side panels and in fixed relationship relative to the box-like housing.

7. A refrigerator assembly comprising, in combination, an outer support including a base, a heat insulated box-like housing, means including side panels having angularly disposed lower edge portions and trunnions carrying said box-like housing at a distance above said base for rocking movement, said box-like housing having an upright position and a forwardly tilted position, in each of which positions said box-like housing is supported through one of said angularly disposed edges of each of the side panels, a refrigerating unit mounted between said box-like housing and said base, hingedly supported means for covering the space between the base and box-like housing, the last mentioned means having louvers therein for the passage of air, and spring means biasing the hingedly supported means toward the housing.

8. In combination, a refrigerator unit including compressor means, a condenser and an evaporator, a base, side walls secured to and extending upwardly from opposite ends of the base, a heat insulated container having a bottom and fitting between said side walls, means for supporting said container between the side walls for rocking movement therebetween to upright and tilted positions, said container being supported at a height to provide room for housing the compressor means and condenser between the base and the bottom of said container and between said side walls, and movable means having air passages therein for covering the space between said base and said container along the side of the container toward which it rocks to said tilted position.

CHARLES G. MINOR.

References Cited in the file of this patent

UNITED STATES PATENTS

| Number | Name | Date |
|---|---|---|
| 525,750 | Swink | Sept. 11, 1894 |
| 812,343 | Horner | Feb. 13, 1906 |
| 1,112,296 | Kyle | Sept. 29, 1914 |
| 1,779,116 | Davenport | Oct. 21, 1930 |
| 1,859,840 | Phelps | May 24, 1932 |
| 2,096,256 | Mitchell | Oct. 19, 1937 |
| 2,304,411 | Keighley | Dec. 8, 1942 |
| 2,537,363 | Minor | Jan. 9, 1951 |